(12) United States Patent
Shachar et al.

(10) Patent No.: US 10,680,419 B2
(45) Date of Patent: Jun. 9, 2020

(54) APPARATUS AND METHOD FOR CLEANING HIGH POWER TRANSMISSION LINES

(71) Applicants: Yehoshua Shachar, Santa Monica, CA (US); Martin Ellenbogen, Ramat Ha Sharon (IL)

(72) Inventors: Yehoshua Shachar, Santa Monica, CA (US); Martin Ellenbogen, Ramat Ha Sharon (IL)

( * ) Notice: Subject to any disclaimer, the term of this patent is extended or adjusted under 35 U.S.C. 154(b) by 0 days.

(21) Appl. No.: 15/851,547

(22) Filed: Dec. 21, 2017

(65) Prior Publication Data

US 2019/0199071 A1  Jun. 27, 2019

(51) Int. Cl.
*H02G 1/02* (2006.01)
*H02J 50/10* (2016.01)
*B08B 1/04* (2006.01)
*B08B 1/00* (2006.01)

(52) U.S. Cl.
CPC ............... *H02G 1/02* (2013.01); *B08B 1/00* (2013.01); *B08B 1/002* (2013.01); *B08B 1/04* (2013.01); *H02J 50/10* (2016.02); *B08B 1/008* (2013.01)

(58) Field of Classification Search
CPC .. H02J 50/10; H02J 50/12; B08B 1/04; B08B 1/002; H02G 1/00; H02G 1/02
See application file for complete search history.

(56) References Cited

U.S. PATENT DOCUMENTS

2018/0207684 A1*  7/2018  Miron ...................... B08B 1/00
2018/0331515 A1* 11/2018  Temple .................... H02G 1/02

* cited by examiner

*Primary Examiner* — Daniel Kessie
(74) *Attorney, Agent, or Firm* — Marcus C. Dawes; Daniel L. Dawes

(57) ABSTRACT

An apparatus for autonomous cleaning of an electrical line includes: an inductive pick up coil concentrically disposed around the electrical line which pick up coil derives its power from the electrical line through inductive coupling; a drive motor having a driving wheel in contact with the electrical line; a power conditioning circuit for conditioning the inductively picked up power from the pick up coil, the drive motor being coupled to the power conditioning circuit; at least one rotating brush in contact with the electrical line for cleaning the electrical line; at least one brush motor coupled to the at least one brush to rotate the brush, the brush motor being coupled to the power conditioning circuit; and a control circuit for controlling the operation of the drive motor and brush motor, the control circuit coupled to the power conditioning circuit.

17 Claims, 4 Drawing Sheets

APPARATUS AND METHOD FOR CLEANING HIGH POWER TRANSMISSION LINES

BACKGROUND

Field of the Technology

The invention relates to the field of methods or apparatus specially adapted for installing, maintaining, repairing, or dismantling electric cables or lines, IPC H02G1/02 for overhead lines or cables and IPC B08B1/04 for cleaning by methods involving the use of tools, brushes, or analogous members using rotary operative members.

Description of the Prior Art

Overhead power lines are used to carry current across great distances and interconnect the electric grid between major cities, power stations and remote towns. These lines typically are made from aluminum alloys and carry currents upwards of 1000 kV. Typically, overhead power lines are not insulated to reduce the operational cost of power transmission for large quantities of electric energy. Instead, overhead powerlines are instead insulated by free air. Although aluminum naturally creates a protective oxidized layer, this layer can grow increasingly thick, or there can be a buildup of particles such as airborne salt, ash, minerals deposited by rain, and bird droppings. As material adheres to the power line, the impedance of the line increases and results in power being dissipated from the lines in the form of heat.

The U.S. Energy Information Administration (EIA) estimates that roughly 5% of all electricity entering overhead power lines is lost as a result transmission. The global average is roughly 10%, but in countries such with power lines in states of disrepair, such as India, power losses can exceed 25%. These power losses translate to about 70 TJ of dissipated energy every year for the US alone. The annual dissipated energy is valued at around 2 billion dollars.

To keep sediment from perpetually accumulating on the overhead power lines, utility companies have addressed this issue and regularly clean these power lines of any build ups. There are several problems that arise from the need to regularly scrub power lines. Ground based transmission line cleaning is either dangerous or expensive. If the lines are left live during cleaning, the cleaning crew is exposed to the danger of arcing between the ground and the transmission lines, resulting in short circuits and fatalities. If the lines are disconnected for cleaning, the utility companies looses revenue in the form of lost power sales. Additionally, many transmission lines are inaccessible by ground crews due to the topography through which they run. Many transmission lines run through mountains, dense forests, and in generally remote hard to access areas.

U.S. Pat. No. 4,477,289 METHOD FOR WASHING VOLTAGE TRANSMISSION LINE INSULATORS outlines a method for using pressurized water cannons shot from helicopters that addresses the issues of remote access. Helicopter assisted washing addresses the issues ground crews face, but is still costly as it requires specialized labor and the use of specialty helicopters that have been fitted with the equipment necessary.

Chinese Application CN201620110090 discloses an automatic solar powered cleaning device of transmission lines, which rides on the transmission line and cleans the line unattended using a plurality of motor driven brushes to scrape or brush the line clean around its entire circumference.

BRIEF SUMMARY

The illustrated embodiments of the invention relate to the field of overhead power line maintenance employing an autonomous device that is powered using induction from the alternating current in the power line to drive a motor that allows the device to traverse back and forth on the power line, as well as a motorized cleaning apparatus. The entire device enclosure opens to allow it to encompass or be mounted onto the power line without the need to disconnect the line. The entire device will be an autonomous closed loop system wherein the device can be installed and can be left to clean the lines they traverse at their own accord based on a cleaning schedule programmed into the device microcontroller. Additional communication with the device such as unplanned cleaning scheduling will remotely implemented through the use of an RF antenna.

The illustrated embodiments of the invention include an apparatus for autonomous cleaning of an electrical line. The apparatus includes: an inductive pick up coil concentrically disposed around the electrical line which pick up coil derives its power from the electrical line through inductive coupling; a drive motor having a driving wheel in contact with the electrical line; a power conditioning circuit for conditioning the inductively picked up power from the pick up coil, the drive motor being coupled to the power conditioning circuit; at least one rotating brush in contact with the electrical line for cleaning the electrical line; at least one brush motor coupled to the at least one brush to rotate the brush, the brush motor being coupled to the power conditioning circuit; and a control circuit for controlling the operation of the drive motor and brush motor, the control circuit coupled to the power conditioning circuit.

The power conditioning circuit comprises a DC power source, where the drive motor is a reversible DC motor, and where the control circuit senses an end of the electrical line to provide selectively reversible DC power to the drive motor.

The three rotating brushes contact the electrical line for cleaning the electrical line. The brushes include a movable cam that adjusts the proximity of the brushes to the wire to prevent undue scraping.

The three brush motors are provided, which are mechanically coupled to the three rotating brushes respectively and are electrically coupled to the power conditioning circuit.

A laser range finder is incorporated on the device at the site of the brush housing to calculate the thickness of the wire where the line meets the brushes. The cam adjusts the brush height according to the reading from the laser rangefinder.

The apparatus further includes at least three additional wheels in contact with the electrical line, one of the at least three additional wheels opposing the drive wheel on an opposing side of the electrical line and the other two of the at least three additional wheels being pair with and opposing each other on opposing sides of the electrical line.

The three rotating brushes each extend over and are in effective contact with at least a 120° segment of the electrical line.

In a preferred embodiment the three rotating brushes are arranged on a common perpendicular cross-sectional plane relative to the electrical line.

The inductive pick up coil comprises a helical coil wound around the electrical line.

The control circuit includes in one embodiment at least two limit switches for sensing the end of the electrical line and a relay logic circuit for reversing the drive motor in response to operation of the two limit switches.

The apparatus further includes supplemental circuitry for use in data collection, operational monitoring, remote control of the apparatus and data wireless communication, the supplemental circuitry coupled to the power conditioning circuit and control circuit.

The apparatus further includes at least one inspection camera to provide real time or recorded visual inspection of the electrical line and operation of the apparatus.

The apparatus further includes a 3-axis accelerometer to be used by the microcontroller to define an inertial framework and to shut the device down in the event of it immobilization to prevent the lines from being damaged or ground down. The accelerometer is shown and described in US Patent Publication 20110301497, incorporated herein by reference in its entirety.

From one perspective the illustrated embodiments of the apparatus for cleaning of an electrical line include an inductive pick up coil concentrically disposed around the electrical line which pick up coil derives its power from the electrical line through inductive coupling; a power conditioning circuit for conditioning the inductively picked up power from the pick up coil; and an electrically driven electrical line cleaning head disposed on the electrical line.

The illustrated embodiments also include within their scope a method for cleaning of an electrical line including the steps of inductively transferring power from the electrical line coil by means of a helical coil concentrically disposed around the electrical line; conditioning the inductively picked up power to use in an electrically driven electrical line cleaning head disposed on the electrical line; and cleaning the electrical line using the electrically driven electrical line cleaning head disposed on the electrical line.

The step of cleaning the electrical line using the electrically driven electrical line cleaning head disposed on the electrical line includes the steps of providing electrical power to a drive motor having a driving wheel in contact with the electrical line; rotating at least one brush in contact with the electrical line for cleaning the electrical line by selectively providing power to at least one brush motor coupled to the at least one brush to rotate the brush; and controlling the operation of the drive motor and brush motor.

The step of providing electrical power to a drive motor having a driving wheel in contact with the electrical line includes the step of providing DC power, where the drive motor is a reversible DC motor, and the step of controlling the operation of the drive motor and brush motor includes the step of sensing an end of the electrical line to provide selectively reversible DC power to the drive motor.

The step of rotating at least one brush in contact with the electrical line for cleaning the electrical line by selectively providing power to at least one brush motor coupled to the at least one brush to rotate the brush includes the step of rotating at least three brushes provided to contact the electrical line for cleaning the electrical line.

The step of rotating at least three brushes provided to contact the electrical line for cleaning the electrical line includes the step of providing at least three brush motors mechanically coupled to the at least three rotating brushes respectively.

The step of rotating at least three brushes provided to contact the electrical line for cleaning the electrical line includes the step of arranging the at least three rotating brushes on a common perpendicular cross-sectional plane relative to the electrical line.

The step of controlling the operation of the drive motor and brush motor includes operating at least two limit switches to sense the end of the electrical line and operating a relay logic circuit to selectively reverse the drive motor in response to operation of the two limit switches.

The method further includes the steps of performing data collection, operational monitoring, performing remote control of the electrically driven electrical line cleaning head, performing data wireless communication and visually inspecting the electrical line with at least one camera to provide real time or recorded visual inspection of the electrical line and cleaning of the electrical line.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

Figure 1:
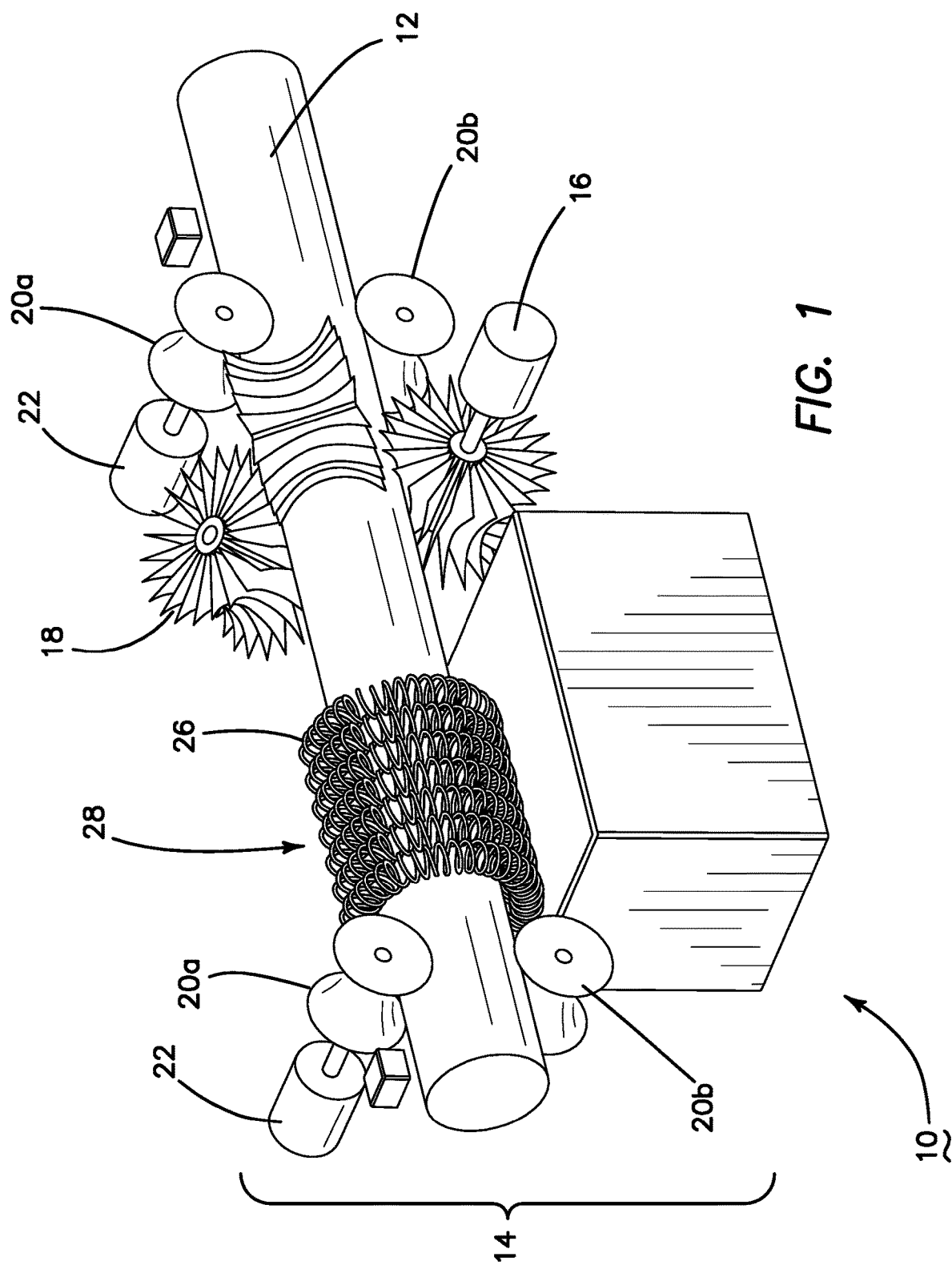
FIG. 1 is a highly diagrammatic perspective view of the primary electromechanical elements of a device according to the illustrated embodiment.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The illustrated embodiments of the invention are directed to a device 10 that attaches to electrical transmission lines 12 and serves as an autonomous cleaning mechanism for medium and high voltage transmission lines 12. The device 10 derives its power from the high voltage lines 12 through inductive coupling and uses this power to move a carriage 14 in which one or more motors 16 included in the carriage 14 and to rotate a plurality of metal or steel brushes 18 or other types of brushes 18 provided with other rigid and durable fibers. Carriage 14 rides on rollers 20a and 20b between which line 12 is engaged or held. Electric motors 22 are coupled to and rotate upper rollers 20a which ride on the top of line 12 to translate carriage 14 along line 12. Each brush 18 is similarly coupled to an electric motor 16 which rotates the brush 18. The purpose of the brushes 18 is to clean debris from the high voltage line 12 on which the device 10 rides as the carriage 14 moves from one end of the line 12 to the other between transmission towers or poles, thereby reducing ohmic losses and heating of the line 12. When the device 10 reaches one end of the line 12, it detects the line termination, such as by a pressure or limit switch 44a, 44b. The device 10 stops and automatically reverses direction to move toward the opposite end of the line 12 from which it just came. This cleaning action can be repeated or continued indefinitely, inasmuch as the device is self-contained and autonomously operated using the cleaned electrical line 12 as a power source.

Three brushes 18, each spanning an angular segment of approximately 120°, are shown in the embodiment of FIG. 1, but any number may be employed with differing angular spans for each. In the illustrated embodiment brushes 18 have been shown all aligned on the same circumferential cross section of line 12, but it is contemplated that brushes 18 may be longitudinally spaced along line 12 to provide an overlapping circumferential coverage of the exterior of line 12. Further, more than one set of cleaning brushes 18 may be employed, for example the arrangement of FIG. 1 could be doubled and embodied by six brushes instead of three by positioning two successive sets of brushes 18 at adjacent longitudinal positions on line 12 and rotated with respect to each other so that the boundary on outside surface of line 12 between two adjacent brushes 18 in one set of three brushes falls directly in the middle of a brush in the longitudinally adjacent second set of three brushes 18. The number and arrangement of brushes 18 contemplated within the scope of the illustrated embodiments are virtually without limitation and innumerable.

The transmission line 12, when alive, carries a high AC current at high voltage, typically tens to hundreds of thousands of volts with high currents, which results in an AC solenoidal magnetic field generated around each line. Inductance between lines due to this magnetic field and its management is well understood. If part of the solenoidal AC magnetic field is enclosed or captured by a loop 26, an emf will be induced in the capturing loop 26 and a current will flow in the loop 26. The current in the loop is given by Faraday's law:

$$Emf = V = -N\Delta(BA)/\Delta t = -NA\, dB/dt \text{ (for a constant area loop)}$$

Where N is the number of turns of the coil, B the magnetic field strength, A the area of the loop and t is time.

Thus, by wrapping a helical coil 28 circumferentially around the line 12 as shown in the diagram of FIG. 1 a plurality of loops 26 comprising the wrapped helical coil 28 are positioned so that a voltage is induced in each loop 26 and collectively in the helical coil 28 with a corresponding AC current therethrough. This current is then used to power motors 16, 22 and microcontroller or controller logic 24. The inductance of coil 28 is determined by the size of loops 26 and the number of wraps of coil 28 around line 12.

Figure 2:
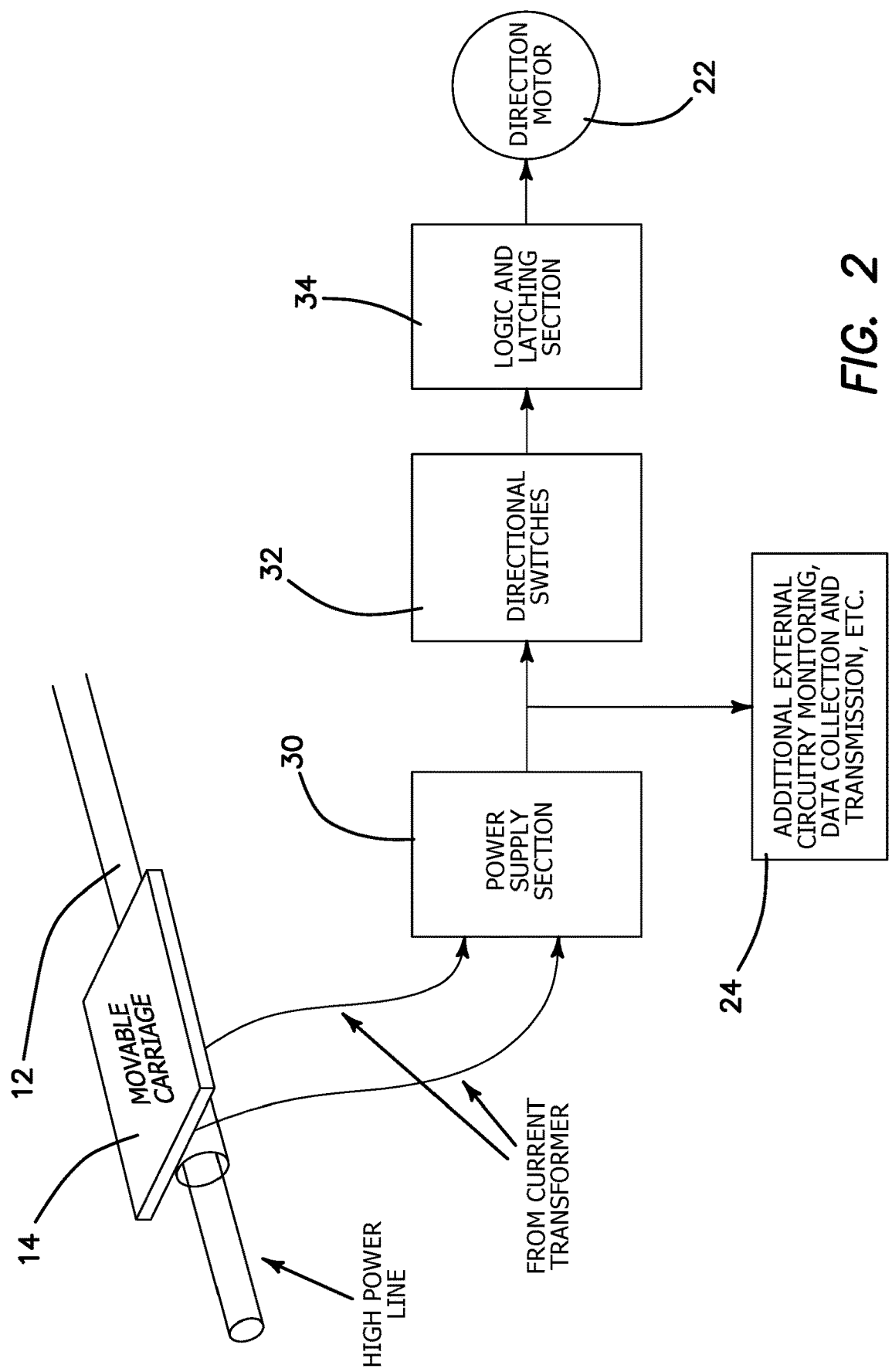
FIG. 2 is a simplified system block diagram of the device of FIG. 1.

FIG. 2 is a simplified system block diagram of the operative elements of device 10. Carriage 14 rider on line 12 includes a power supply section 30 coupled to coil 28 for inductively picking up AC power from line 12. The AC voltage is converted in section 30 into a DC power signal and supplied to microcontroller or controller logic 24 and to directional switches 32. The status of motion and position of carriage 14 as determined by directional switches 32 is provided to logic and latching section 34 from which input the directional control of reversible motors 22 is controlled. The operation of the device 10 can be turned on or off as desired by means of remote control of an onboard microcontroller or controller logic 24 from either a ground based signal or a predetermined calendar file, thereby completing and interrupting the electrical motors 22.

Each limit switch determines in its turn the direction of motion of the carriage 14 on the line 12. Additionally, two limit switches 44a, 44b are provided, one for detection of the limit of travel in the left direction, and other for detection of the limit of travel in the right direction. When the power is first turned on, neither relay is energized. The system has to "be told" the first time to which direction to move (although this function, i.e. of automatic determination of the first time direction, can be built into the system as a power-up function of the electronics. This can be achieved using microprocessor 24 as described above). When either of the direction limit switches is pressed, the activation switch activation is momentary. The switch, once activated, can then be released; the system will remember the direction of last travel as determined by the activation of the left or right limit switch, and then automatically moves in the opposing direction until once again a limit is detected.

Figure 4:
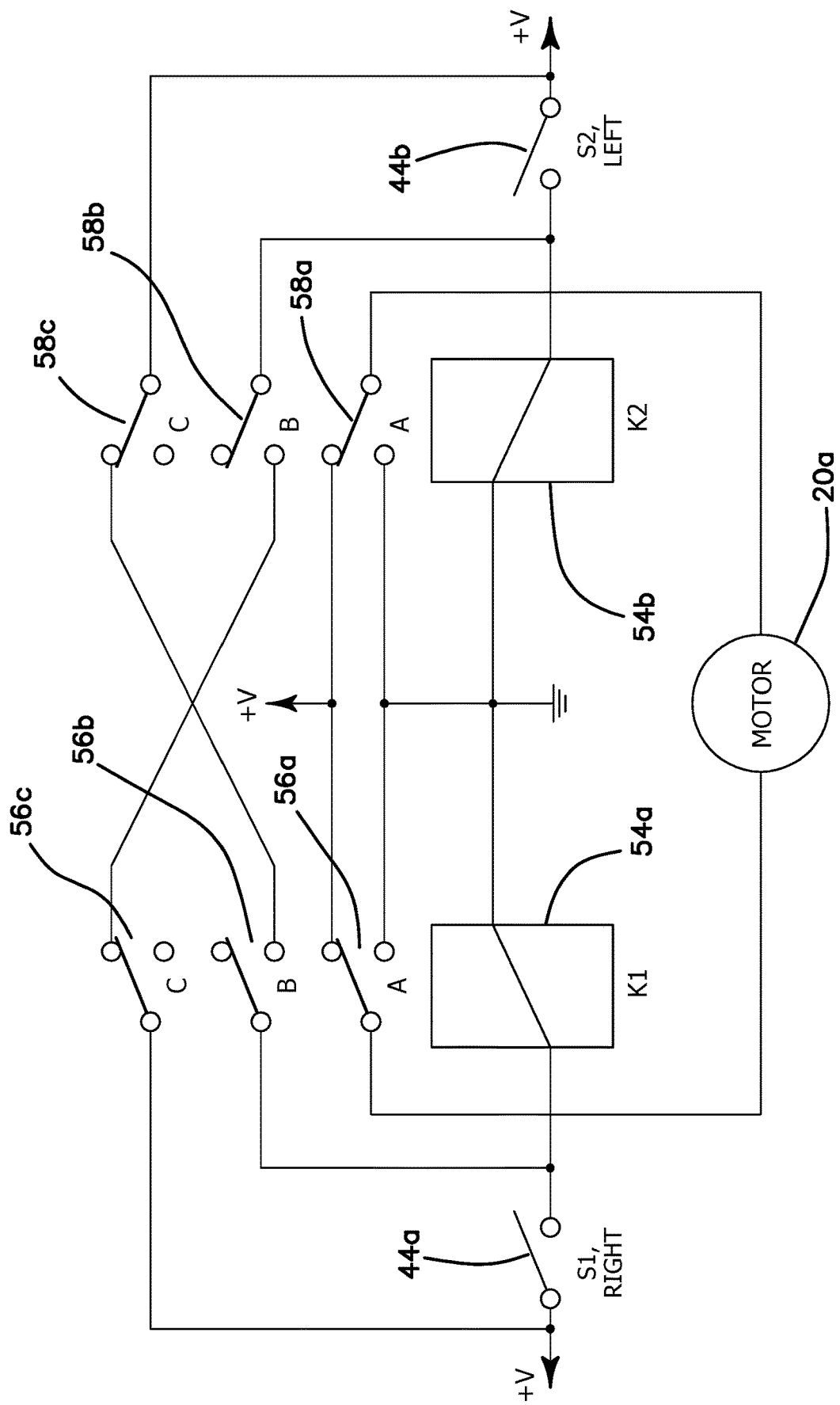
FIG. 4 is a circuit diagram of a relay logic section used in one embodiment of the invention.

In one embodiment, the logic section 34 as best shown in FIG. 4 is comprised of two latching relays 54a, 54b. The DC power supply is fed into a pair of directional switches 44a, 44b that determine the direction of current flow as dictated by the logic latching section. This current is fed into a reversible motor 22. The logic section is comprised of two latching relays 54a, 54b. Latching relays 54a, 54b are powered through two limit switches 44a, 44b respectively. Each relay 54a, 54b has a set of two pole three throw contacts 56a-56c and 58a-58c respectively. Note that the circuit topology is symmetric between it's left and rights sides. Through contacts 56c and 58c which are interconnected to contacts 58b and 56b respectively. Contacts 56a-56c and 58a-58c and switches 44a and 44b are shown in their normal positions when neither relays 54a and 54b are powered. When limit switch 44b, for example closes momentarily, relay 54fb is powered. Relay 54b is then connected to the power supply through the closure of contact 58b and the normal open position of contact 56c. The motor 22 is provided power through normal open contact 56a and closed contact 58a. Switch 44b may open and motor 22 will continue to be provided with power. When device 10 reaches the opposite end of the line 12, limit switch 44a will close momentarily. Relay 54a will be energized and the opposite circuit configuration relative to the power supply will be assumed. Contact 56c closes cutting off power to relay 54b and power will now be supplied to motor 22 through contact 58a, which will be in the opposite direction or with the opposite DC polarity than when it was supplied by through contact 56a. Motor 22 will now run in the opposite direction moving carriage 14 back to the opposing end of line 12.

Figure 3:
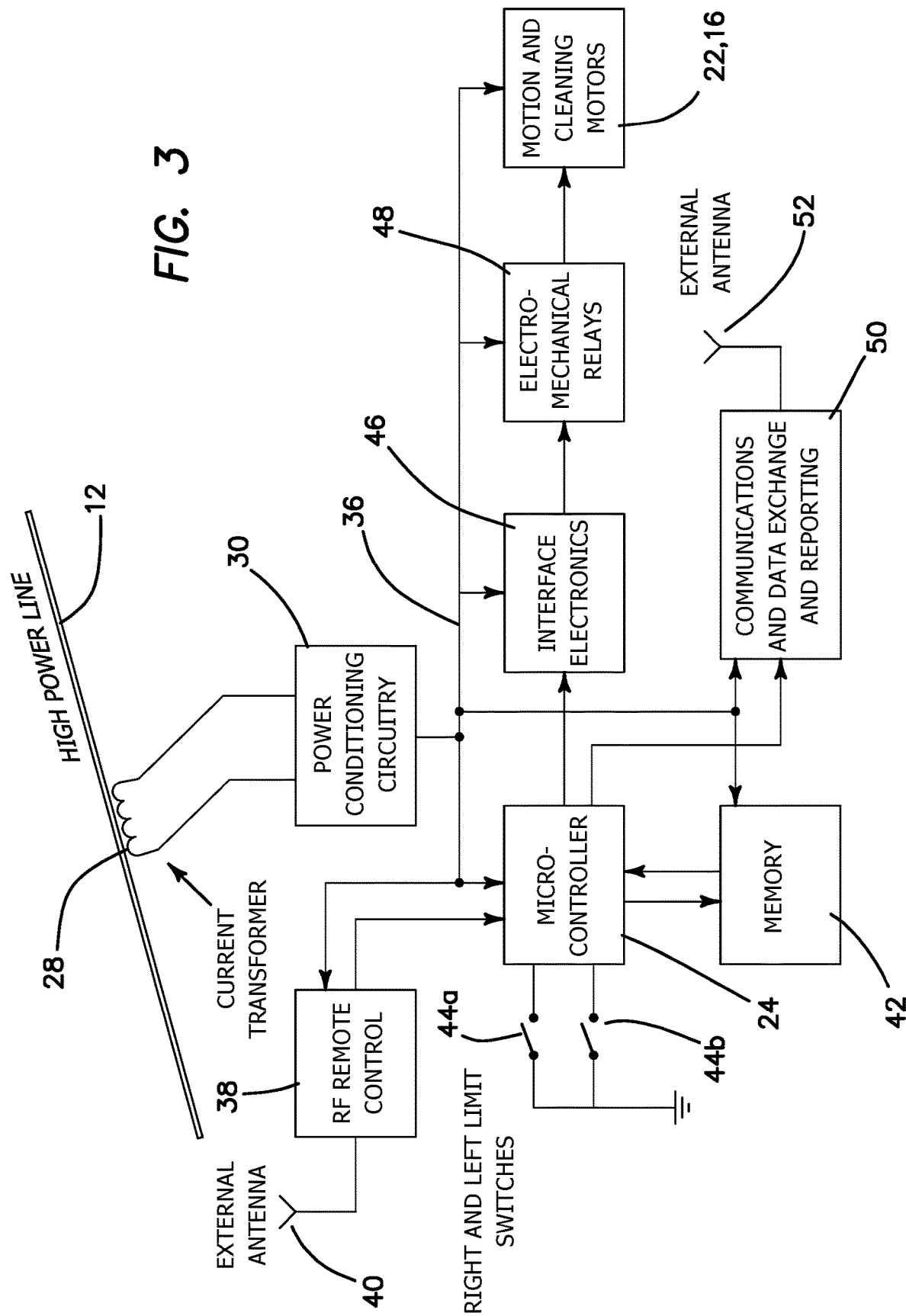
FIG. 3 is a system block diagram of another embodiment of the device of FIG. 1.

In addition to the operational circuitry used on the device 10, there may be additional circuitry as diagrammatically illustrated in FIG. 3 which may not be principally used for the movement of carriage 14. Such circuitry may include data collection, elapsed operation time, various monitoring functions of various operations, remote control of the entire system via an radio frequency (RF) link, and transmission of the data to a remote location via the means of a RF transmission or any other means of transmission. In this second embodiment power section 30 serves as the power source for a power bus 36 to which an RF remote controller circuit 38 is coupled with a transceiver antenna 40. Remote controller circuit 38 is bidirectionally coupled to microcontroller 24 with its memory 42. Limit switches 44a, 44b provide inputs to microcontroller 24, which provides an output to interface circuitry 46 to drive electromechanical relays 48 selectively supplying power to motors 16 and 22. A separate communications, data exchange and reporting circuit 50 with its antenna 52, operating at a different frequency than remote controller circuit 38 may also be provided.

Microcontroller or controller logic 24 is broadly understood to include any secondary electronic equipment desired. For example, an RF digital transceiver may be included and coupled to microcontroller or controller logic 24 for communication with a remote station or control center using any one of a plurality of possible networks or communication links for remote reporting and control to and from device 10. Still further device 10 may include on or more inspection cameras that provide real time or recorded visual inspection of line 12 and the state of its cleanliness or other condition.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. An apparatus for autonomous cleaning of an electrical line comprising:
    an inductive pick up coil concentrically disposed around the electrical line which pick up coil derives its power from the electrical line through inductive coupling;
    a drive motor having a driving wheel in contact with the electrical line;
    a power conditioning circuit for conditioning the inductively picked up power from the pick up coil, the drive motor being coupled to the power conditioning circuit;
    at least one rotating brush in contact with the electrical line for cleaning the electrical line;
    at least one brush motor coupled to the at least one brush to rotate the brush, the brush motor being coupled to the power conditioning circuit; and
    a control circuit for controlling the operation of the drive motor and brush motor, the control circuit coupled to the power conditioning circuit,
    where the control circuit comprises at least two limit switches for sensing the end of the electrical line and a relay logic circuit for reversing the drive motor in response to operation of the two limit switches.

2. The apparatus of claim 1 where the power conditioning circuit comprises a DC power source, where the drive motor is a reversible DC motor, and where the control circuit senses an end of the electrical line to provide selectively reversible DC power to the drive motor.

3. The apparatus of claim 1 where at least three rotating brushes provided in contact with the electrical line for cleaning the electrical line.

4. The apparatus of claim 3 where at least three brush motors are provided, mechanically coupled to the at least three rotating brushes respectively and electrically coupled to the power conditioning circuit.

5. The apparatus of claim 1 further comprising at least three additional wheels in contact with the electrical line, one of the at least three additional wheels opposing the drive wheel on an opposing side of the electrical line and the other two of the at least three additional wheels being pair with and opposing each other on opposing sides of the electrical line.

6. The apparatus of claim 3 where the at least three rotating brushes each extend over and are in effective contact with at least a 120° segment of the electrical line.

7. The apparatus of claim 6 where the at least three rotating brushes are arranged on a common perpendicular cross-sectional plane relative to the electrical line.

8. The apparatus of claim 1 where the inductive pick up coil comprises a helical coil wound around the electrical line.

9. The apparatus of claim 1 further comprising supplemental circuitry for use in data collection, operational monitoring, remote control of the apparatus, motion sensing using data wireless communication, the supplemental circuitry coupled to the power conditioning circuit and control circuit.

10. The apparatus of claim 1 further comprising at least one inspection camera to provide real time or recorded visual inspection of the electrical line and operation of the apparatus.

11. An apparatus for cleaning of an electrical line comprising:

an inductive pick up coil concentrically disposed around the electrical line which pick up coil derives its power from the electrical line through inductive coupling;
a power conditioning circuit for conditioning the inductively picked up power from the pick up coil;
an electrically driven electrical line cleaning head disposed on the electrical line; and
a control circuit comprising at least two limit switches for sensing the end of the electrical line and a relay logic circuit for reversing a drive motor in response to operation of the two limit switches.

12. A method for cleaning of an electrical line comprising:
inductively transferring power from the electrical line coil by means of a helical coil concentrically disposed around the electrical line;
conditioning the inductively picked up power to use in an electrically driven electrical line cleaning head disposed on the electrical line; and
cleaning the electrical line using the electrically driven electrical line cleaning head disposed on the electrical line,
where cleaning the electrical line using the electrically driven electrical line cleaning head disposed on the electrical line comprises:
providing electrical power to a drive motor having a driving wheel in contact with the electrical line;
rotating at least one brush in contact with the electrical line for cleaning the electrical line by selectively providing power to at least one brush motor coupled to the at least one brush to rotate the brush; and
controlling the operation of the drive motor and brush motor, and
where controlling the operation of the drive motor and brush motor comprises operating at least two limit switches to sense the end of the electrical line and operating a relay logic circuit to selectively reverse the drive motor in response to operation of the two limit switches.

13. The method of claim 12 where providing electrical power to a drive motor having a driving wheel in contact with the electrical line comprises providing DC power, where the drive motor is a reversible DC motor, and where controlling the operation of the drive motor and brush motor comprises sensing an end of the electrical line to provide selectively reversible DC power to the drive motor.

14. The method of claim 12 where rotating at least one brush in contact with the electrical line for cleaning the electrical line by selectively providing power to at least one brush motor coupled to the at least one brush to rotate the brush comprises rotating at least three brushes provided to contact the electrical line for cleaning the electrical line.

15. The method of claim 14 where rotating at least three brushes provided to contact the electrical line for cleaning the electrical line comprises providing at least three brush motors mechanically coupled to the at least three rotating brushes respectively.

16. The method of claim 14 where rotating at least three brushes provided to contact the electrical line for cleaning the electrical line comprises arranging the at least three rotating brushes on a common perpendicular cross-sectional plane relative to the electrical line.

17. The method of claim 12 further comprising performing data collection, operational monitoring, performing remote control of the electrically driven electrical line cleaning head, performing data wireless communication and visually inspecting the electrical line with at least one camera to provide real time or recorded visual inspection of the electrical line and cleaning of the electrical line.

* * * * *